Ross & Mitchell,
Harrow.
No. 88,669. Patented Apr. 6, 1869.

Witnesses:
Wm. S. Pease
S. S. White

Inventors
J. R. Ross.
W. D. Mitchell.

J. R. ROSS AND W. D. MITCHELL, OF CENTRALIA, ILLINOIS.

Letters Patent No. 88,669, dated April 6, 1869.

IMPROVEMENT IN COMBINED HARROW AND CULTIVATOR.

The Schedule referred to in these Letters Patent and making part of the same.

*To all whom it may concern:*

Be it known that we, J. R. Ross and W. D. Mitchell, of Centralia, in the county of Marion, in the State of Illinois, have invented an Improved Combined Harrow and Cultivator, to be used as a common harrow or cultivator; and we do hereby declare that the following is a full and exact description thereof, reference being had to the accompanying drawings, and to the letters of reference marked thereon.

The nature of this invention consists in constructing a revolving cultivator, which may be enlarged to the size of a two-horse harrow, by the means of curved sections, which may be secured to the arms.

To enable others skilled in the art to make and use my invention, I will proceed to describe its construction and operation.

Figure 1:
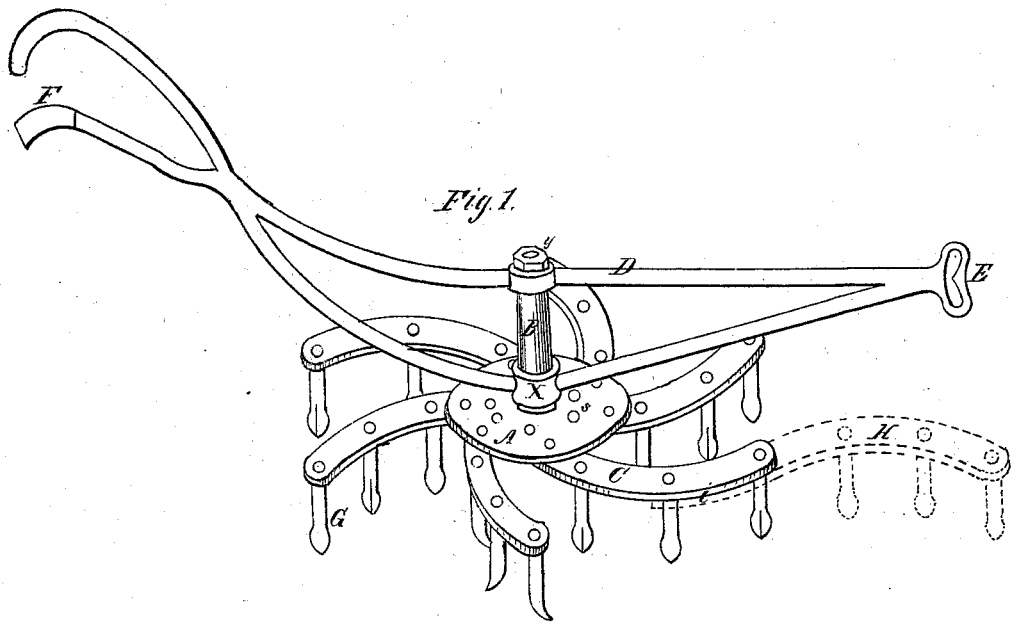
Figure 1 represents a perspective view of this machine as a cultivator, the dotted lines showing how the curved sections are arranged, for the purpose of enlarging it to a harrow.

A, fig. 1, represents a cast-metal plate, having, in its centre, a tube, or pipe, B, through which passes a bolt, from the under side, which is held in its place by the nut $y$.

The plate A and tube B are cast in one piece.

The curved arms C, in which are secured the teeth, G, are bolted or otherwise secured to the plate A, as shown in the drawing, their peculiar shape rendering it easy to so arrange the teeth that no three of them shall ever come in line.

The double beam, D, is provided with a boss, X, in its upper and lower parts, and terminates at one end in a clevis, E, and at the other end, in the handles F, the form of the beam rendering it very strong, even when made of very light iron.

The lower boss, X, is made large enough to revolve freely on the tube B, while the top one is made to rest on top of the tube B, the bolt passing up through it.

The teeth G are made, at the point, in the shape of a small fluke, and are secured in the curved arms C, with the faces in opposite directions, alternately, which, as the harrow revolves, presents a constantly-changing cutting and crushing-surface to the clods of earth.

Claims.

What we claim as our invention, and desire to secure by Letters Patent, is—

1. The alternate arrangement of the fluke-shaped teeth, with the faces in opposite directions.

2. The curved arms C, in which are screwed, or otherwise secured, the teeth G.

Figure 2:
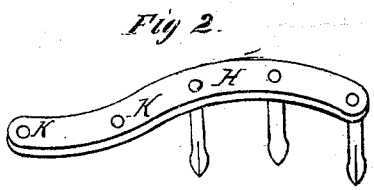
Figure 2 represents a detached section, one of which is to be secured to each of the arms of the cultivator, when it is desired to use as a harrow.

3. The curved section, fig. 2, for the purpose of enlarging the implement.

4. The beam D, substantially as shown and described.

5. A harrow and cultivator combined, when constructed substantially as herein set forth and described.

J. R. ROSS.
W. D. MITCHELL.

Witnesses:
 WM. S. PEASE,
 S. D. WHITE.